J. R. SNYDER.
AIR BRAKE SYSTEM.
APPLICATION FILED APR. 10, 1912.
1,094,943.
Patented Apr. 28, 1914.
4 SHEETS—SHEET 4.
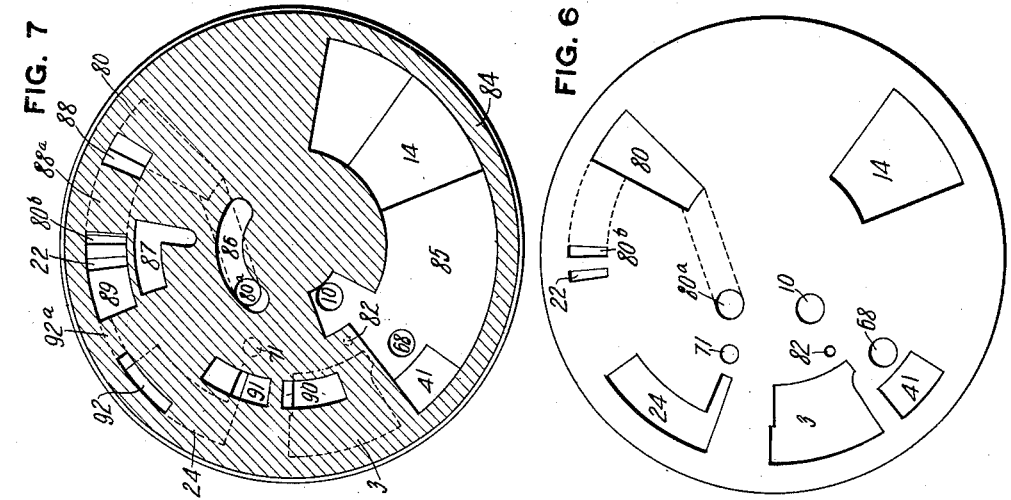
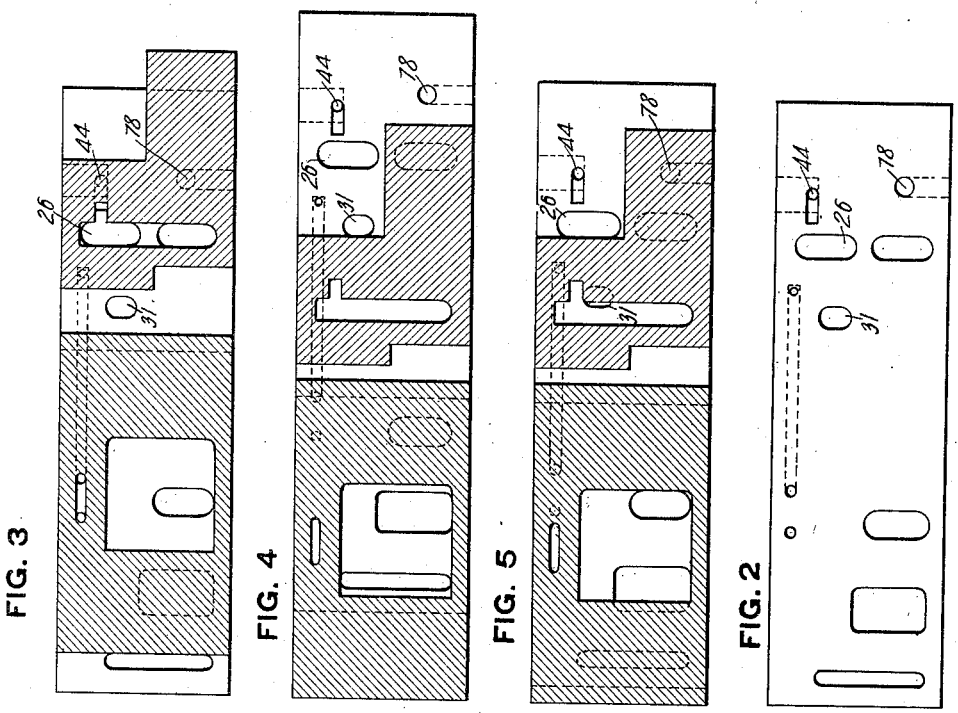
WITNESSES
INVENTOR
Jacob Rush Snyder
By Fredk W Winter
Attorney

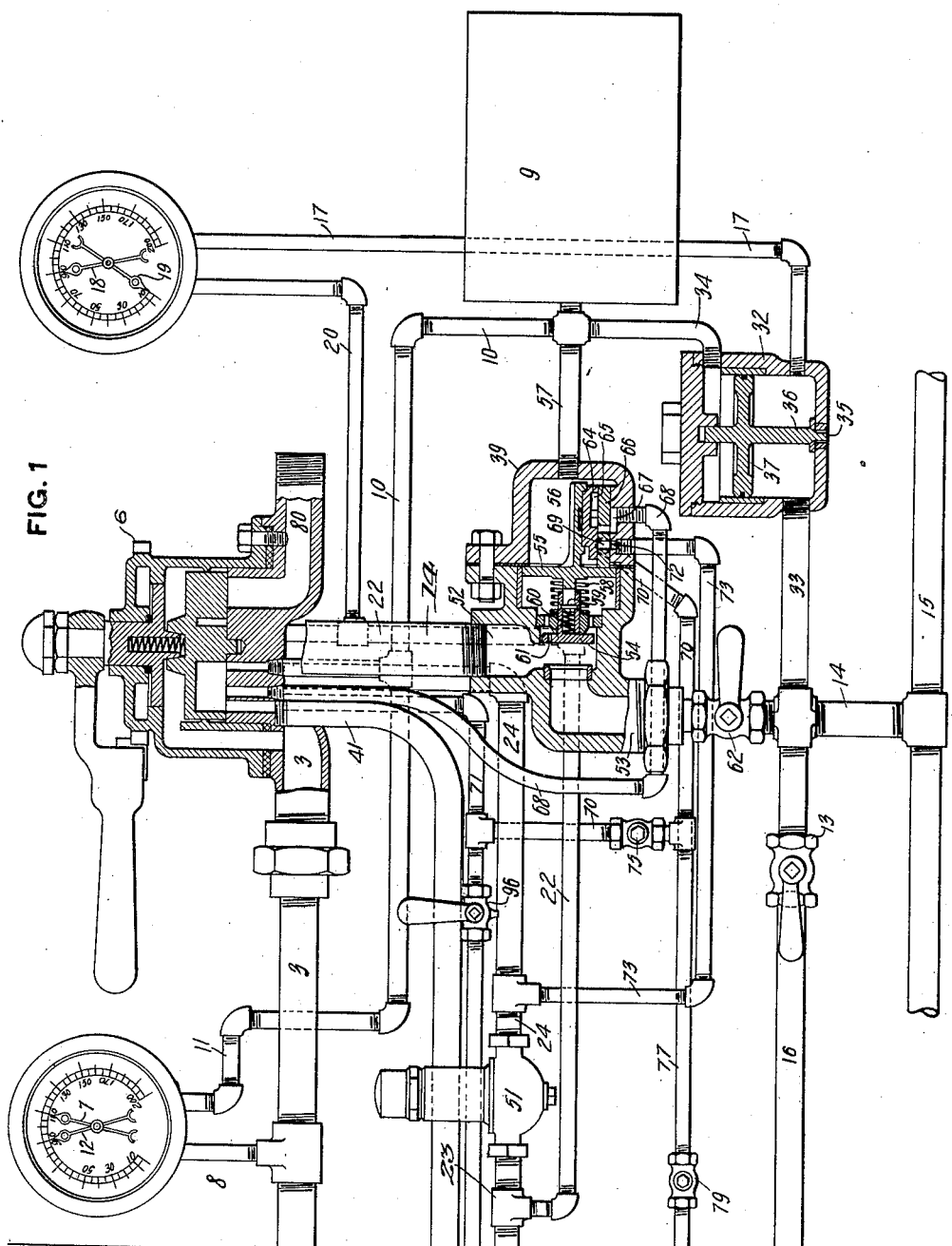

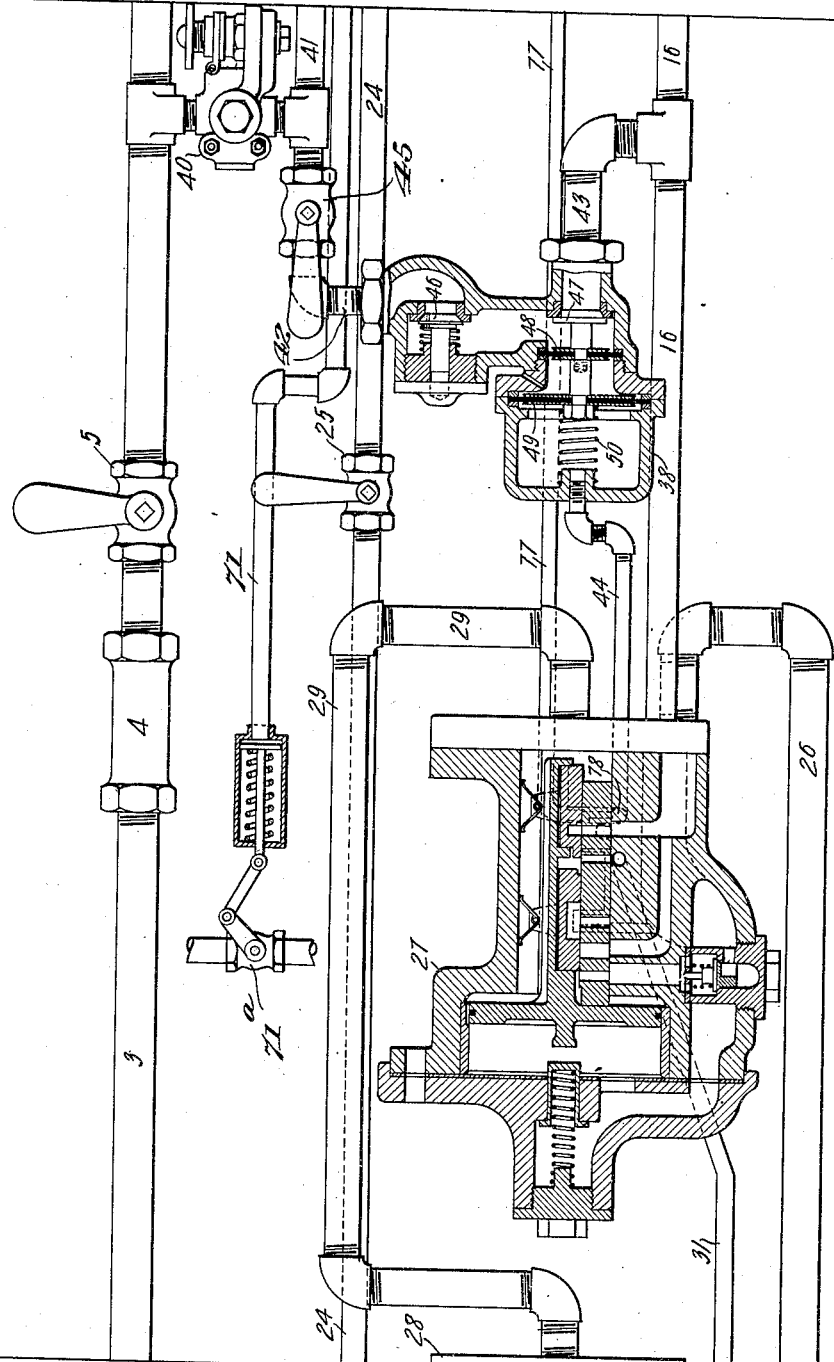

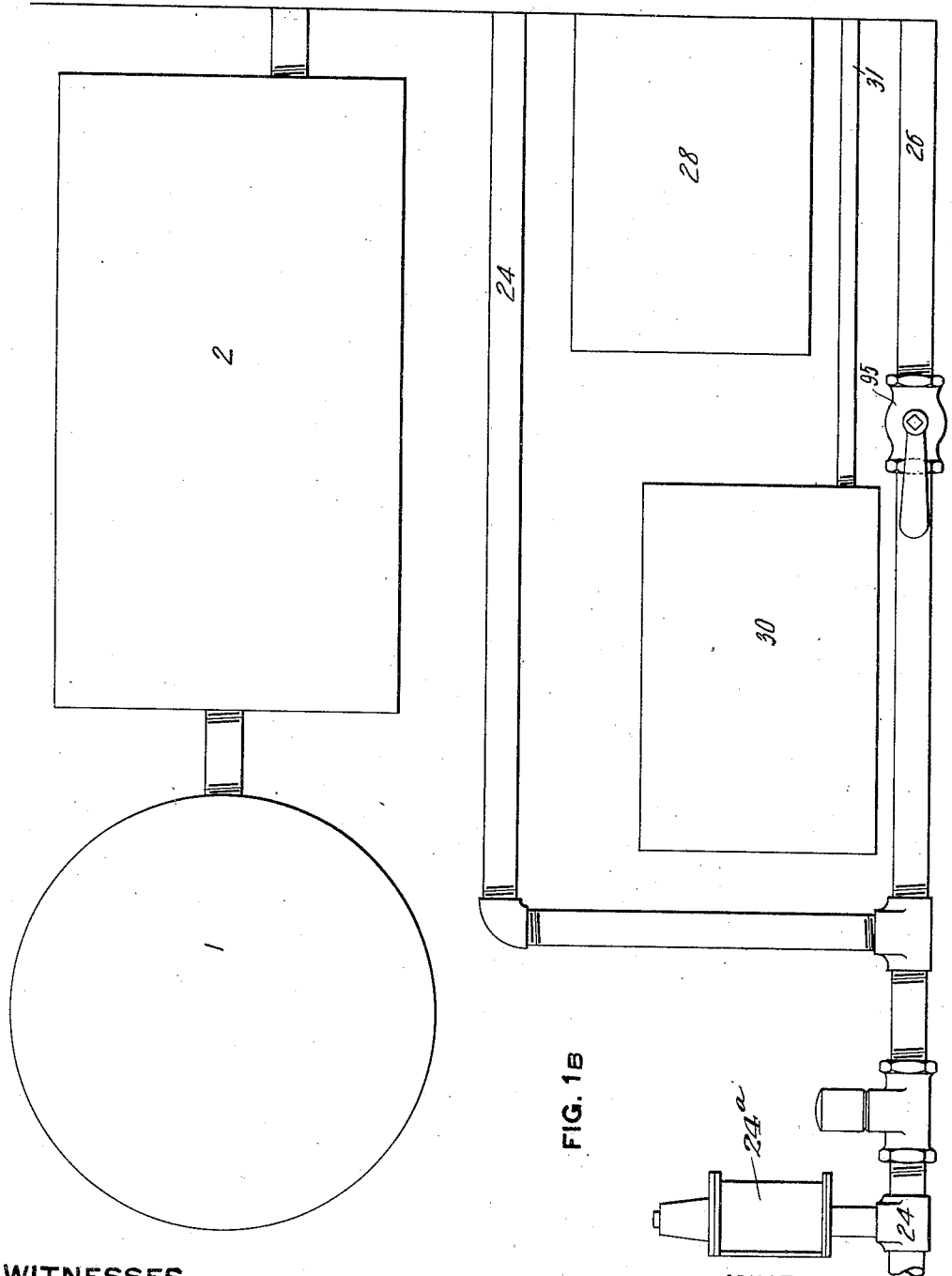

UNITED STATES PATENT OFFICE.

JACOB RUSH SNYDER, OF PITTSBURGH, PENNSYLVANIA, ASSIGNOR, BY MESNE ASSIGNMENTS, TO PITTSBURGH AIR BRAKE COMPANY, A CORPORATION OF PENNSYLVANIA.

AIR-BRAKE SYSTEM.

1,094,943.                Specification of Letters Patent.    Patented Apr. 28, 1914.

Application filed April 10, 1912. Serial No. 689,753.

*To all whom it may concern:*

Be it known that I, JACOB RUSH SNYDER, a resident of Pittsburgh, in the county of Allegheny and State of Pennsylvania, have invented a new and useful Improvement in Air-Brake Systems, of which the following is a specification.

This invention relates to air brake systems for railway trains.

The purpose of the invention is to provide a system in which better control of the brakes of the train as a whole, and of the engine and train brakes independently, is secured than with prior systems, and which system is particularly designed for double heading, and is so arranged that upon bursting of the train line for any cause the engine brakes are automatically applied and the steam supply to the engine cylinders is automatically cut off.

The invention comprises the arrangement of parts and the special valves hereinafter described and claimed.

In the accompanying drawings, Figures 1, 1^A and 1^B show the system diagrammatically; Fig. 2 is a plan view of the engine triple valve seat; Figs. 3, 4 and 5 are diagrammatic views of the engine triple valve in different positions, Fig. 3 showing running position, Fig. 4 emergency application position, and Fig. 5 service application position; Fig. 6 is a plan view of the valve seat of the engineer's brake valve; and Fig. 7 is a horizontal section through the rotary disk valve of the engineer's valve showing the same in running position.

In the drawings, 1 indicates an air pump and 2 the main reservoir supplied thereby, from which a pipe 3 provided with strainer 4 and cut-off cock 5 leads to the engineer's brake valve 6. A gage 7 is connected at 8 to the main reservoir pipe 3.

9 is the equalizing reservoir having a pipe connection 10 to the engineer's brake valve 6 and a connection 11 to gage 12.

14 is the train pipe connection to the engineer's brake valve and connecting through an intermediate valve, hereinafter to be described, with the train line 15, running for the full length of the train, and with an engine brake pipe 16 in which is a cut-off cock 13. The train pipe side of equalizing valve 32 has a connection 17 to a gage 18. Another gage 19 has a connection 20 with a pipe 22 connected to the engineer's brake valve and joined at 23 to a pipe 24 also connected to the engineer's brake valve and leading to the engine brake cylinder 24^a. Pipe 22 forms a by-pass release pipe for the engine brake cylinder. A cut-off cock 25 is placed in pipe 24 between the brake cylinder and the connection of pipe 22 with pipe 24. Also leading to the engine brake cylinder is a pipe 26 connected to a triple valve 27.

28 is the auxiliary reservoir connected by pipe 29 to triple valve 27, and 30 is a supplementary reservoir connected by pipe 31 to triple valve 27.

32 shows an ordinary equalizing valve having a connection 33 to the train pipe and a connection 34 to the equalizing reservoir and a vent port 35 to the atmosphere. Port 35 is controlled by valve 36 actuated by piston 37 in the valve casing and subjected on its upper face to equalizing reservoir pressure through connection 34 and on its lower face to train pipe pressure through connection 33. This valve operates in the usual manner of equalizing valves, that is to say, for service applications the pressure in equalizing reservoir 9 is reduced to the proper degree and the engineer's brake valve then put in lap position. This causes valve 36 to open and permits the train pipe to vent to the atmosphere until it equalizes with the retained pressure in the equalizing reservoir.

All of the parts so far described are of the usual construction, with the exception of the engineer's brake valve 6 and triple valve 27, which are of special construction as hereinafter described. The engineer's brake valve 6 is of the construction described and illustrated in detail and claimed in my application filed March 30, 1912, Serial No. 687,537, and the triple valve 27 is of the construction shown and described and claimed in my application filed March 30, 1912, Serial No. 687,534. The system also contains two other special valves, to-wit, a double heading valve 38, which is specifically shown, described and claimed in my application filed March 30, 1912, Serial No. 687,535, and an emergency cut-off valve 39 which operates automatically upon bursting of the train line, applies the engine brakes and cuts off the steam from the engine cylinders and also prevents main reservoir air from escaping to the atmosphere at the time of such an application, and which is shown, described and claimed in my application filed March 30, 1912, Serial No. 687,536.

The main reservoir pipe 3 is connected through a feed valve 40 (which may be of any usual or any preferred construction) with a pipe 41 which at one end is connected to the engineer's brake valve and at its opposite end to the upper end of the casing of double heading valve 38. The valve 38 also has a connection at 43 with the engine brake pipe 16, and on its opposite end is connected by pipe 44 with the triple valve 27. A cut-off cock 45 is placed in pipe 41 between the feed valve 40 and the double heading valve 38. In the connection between the main reservoir connection 42 and train pipe connection 43 is a check valve 46 spring seated toward the main reservoir, and a cut-off valve 47 seating toward the train pipe and actuated by a differential piston mechanism composed of the small diaphragm 48 open to main reservoir or train pipe pressure, and the larger diaphragm 49 in communication with the triple valve 27 through pipe 44. A spring 50 reinforces the pressure on the larger area of said differential piston mechanism. When triple valve 27 is in service or emergency application position, pressure is admitted to the larger area of differential piston mechanism to seat valve 47 and close communication from the main reservoir to the train pipe and prevent the main reservoir pressure on the engine from kicking off the brakes when the engine is being used as the second or subsequent engine in a multiple header. When the triple valve 27 is in running or full release position, pressure is vented from valve 38 through pipe 44 to the atmosphere and consequently main reservoir pressure acting on the smaller area of the differential piston mechanism unseats valve 47 and opens communication between the main reservoir and the train pipe on the engine.

The triple valve 27 is further so constructed that in emergency position (Fig. 4) it connects both the auxiliary reservoir 28 and supplementary reservoir 30 to the brake cylinder to get a strong braking action, while in service application (Fig. 5) only the auxiliary reservoir is connected to the brake cylinder. When said valve is in graduated or full release position (Fig. 3), supplementary reservoir air is permitted to flow to the auxiliary reservoir to replenish the latter, all as more fully described and claimed in my application filed March 30, 1912, Serial No. 687,534, above referred to.

In the pipe 24 between the connection of the by-pass release pipe 22 therewith and the engineer's brake valve is an ordinary reducing valve 51, so as to reduce main reservoir pressure which can be admitted from the main reservoir directly to the engine brake cylinder in one position of the engineer's brake valve.

The emergency cut-off valve 39 is of special construction, having a connection at 52 to the engineer's brake valve and at 53 to the train pipe. Between these connections communication is controlled by means of valve 54 actuated from piston 55 opening on one side to train pipe pressure and on its opposite side to pressure in chamber 56 having connection 57 with the equalizing reservoir. A spring 58 assists in holding the piston in such position that valve 54 is open, in which position communication between the engineer's brake valve and the train pipe is established. When the piston is in its opposite position, such as occurs upon sudden reduction of train pipe pressure due to bursting of the hose or the like, the valve 54 seats and closes communication from the engineer's brake valve to the train pipe so as to prevent wasting main reservoir pressure which would naturally occur when the engineer's valve is in running or full release position. In order that valve 54 may not interfere with the emergency reduction of train pipe pressure to the engineer's brake valve, it has a lost motion connection with the piston, such as by the pin and slot connection 59, and is held extended by a light spring 60, which, however, is not strong enough to materially retard the outflow of air from the train pipe when the engineer's brake valve is placed in emergency application position. Valve 54 is provided with an equalizing port 61 to permit the pressure to equalize on opposite sides of the valve when closed and when cut-off cock 62 on the train pipe side is also closed, in order to permit the spring 58 to open the valve 54. After actuation of valve 54 the cock 61 is momentarily closed to permit pressure on the opposite sides of valve 54 to equalize. Piston 55 also actuates slide valve 64 provided with a cavity 65 and controlling ports in seat 66, to-wit, port 67 connected by pipe 68 to the engineer's brake valve; port 69 connected by pipe 70 to another pipe 71 coming from the engineer's brake valve and leading to a steam cut-off valve 71ª; and port 72 connected by pipe 73 to brake cylinder pipe 24. The ports and cavities are so arranged that normally the ports 67, 69 and 72 are blanked, but when the piston 55 moves over under train pipe reduction, due to bursting of a hose or the like, the main reservoir pressure coming by way of engineer's valve 6 through pipe 68 is admitted directly to brake cylinder pipe 24 to apply the engine brakes, and also passes by pipe 70 to the steam cut-off valve which cuts off the supply of steam to the engine cylinders. As a consequence the engine is stopped and the draw bars are prevented from being pulled out.

A check valve 75 is placed in pipe 70 to prevent air from passing from the main reservoir through pipes 71 and 70 to the valve 39 when the engineer's brake valve is in position to admit air directly from the main reservoir through pipe 71 to the steam cut-off valve. A pipe 77 also connects pipe 70 with port 78 in the triple valve, which port is so located that when the triple valve moves to emergency position (Fig. 4) said port is uncovered and permits auxiliary and supplementary reservoir pressures to flow through pipes 77, 70 and 71 to the steam cut-off valve, thereby supplementing main reservoir air coming either directly through the engineer's valve through pipe 71 or coming by way of the emergency cut-off valve 39 through pipes 68, the cavity in the cut-off valve 64, and pipe 70. A check valve 79 is placed in the pipe 77 between the triple valve 27 and the point of connection with pipe 70 and so arranged as to prevent air from flowing from pipe 70 into the triple valve 27 when the engine is single heading.

When the engine is single heading or is the leading engine in a double header, the cut-off cocks 13 in pipe 16 and 95 in pipe 26 are closed so that the triple valve, auxiliary and supplementary reservoirs on the engine are out of commission, and the brake cylinders on the engine are charged and exhausted entirely through the engineer's brake valve by direct air from the main reservoir. The cut-off cock 45 is also closed so that main reservoir air can flow to the train pipe only by way of the engineer's valve. When running second or later in a multiple header, the cocks 13, 45 and 95 are open and the engineer's valve set in either running or train release and engine lap position and cut-off cock 62 is closed. Consequently, the triple valve acts to set the brakes on the engine exactly like on a subsequent car, and the main reservoir has connection to the train pipe by way of the double heading valve 38.

The engineer's brake valve has its seat provided with ports for the connection therewith of pipes 3, 10, 14, 22, 24, 41, 68 and 71. In addition, it is provided with exhaust port 80 leading to the atmosphere and connected by underneath passages to additional ports 80$^a$ and 80$^b$; and also is provided with a small warning port 82 opened to the atmosphere.

The rotary member or disk 84 is provided with suitable cavities to properly connect the several ports in the seat, to-wit, a large cavity 85 of general arc shape, a small arc-shaped cavity 86 lying opposite cavity 85 and relatively near to the center, another arc-shaped cavity 87 located radially outside of cavity 86 and having a radially inwardly projecting part; another arc-shaped cavity 89 lying outside of cavity 87 and connected by passage 92$^a$ with a smaller arc-shaped cavity 92; an arc-shaped cavity 88 to the right of cavity 89, and a pair of arc-shaped cavities 90 and 91 located between large cavity 85 and cavity 87.

The engineer's brake valve has ten positions and in which the various parts of the mechanism operate as follows:

(1) *Running position.*—In this position the large cavity 85 of the engineer's valve connects port 41 coming from the main reservoir by way of the feed valve 40, to train pipe port 14, equalizing reservoir port 10 and emergency cut-off valve port 68. This charges the train pipe 15 and equalizing reservoir 9 to main reservoir pressure as reduced by the feed valve 40. The emergency cut-off valve 39 is then held in its extreme right hand position by the balancing of train pipe pressure on one side of piston 55 and by equalizing reservoir pressure coming through pipe 57 on its opposite face, in which position the slide valve 64 of said valve blocks or blanks the port 67 to which pipe 68 is connected. Should now a hose burst or the conductor's valve be opened with the engineer's brake valve in running position, pressure on the train pipe side of piston 55 is suddenly reduced, thereby permitting equalizing reservoir pressure to move said piston over and permit slide valve 64 to connect ports 67, 69 and 72, thereby permitting main reservoir air coming through pipe 68 to flow through pipes 70 and 71 to the steam cut-off valve and through pipes 73 and 24 to the engine brake cylinder. This applies the brake on the engine and also cuts off steam from the engine cylinders. The engine brake cylinder port 24 is lapped by the cavity 92 so that brake cylinder air is vented through passage 92$^a$ to cavity 89 and thence to exhaust port 80. Cavity 88 also connects by-pass release pipe port 22 with the exhaust port 80$^b$. Consequently, the engine brake cylinders will appear to be released. However, air to the brake cylinders will be supplied from the main reservoir more rapidly than it can escape to the atmosphere until the engineer moves his brake valve to some application or lap position. To obviate any such occurrence, the engineer may carry his brake valve in engine lap and train release position after the engine brake cylinders have been exhausted and treat the same as running position.

(2) *Service position.*—In this position the equalizing reservoir port 10 is connected by cavity 86 to exhaust port 80$^a$, thereby reducing the pressure in the equalizing reservoir and unbalancing piston 37 to permit the equalizing valve 36 to open and vent the train pipe to the atmosphere and set the brakes as is usual; also, cavity 92 connects main reservoir port 3 with port 24, thereby applying the engine brakes. Cavity 91 also connects main reservoir port 3 with the emergency cut-off valve port 68, so that should a hose burst or the conductor's valve be opened, the steam would be cut-off and the engine brakes applied as in the previous position.

(3) *Emergency position.*—In this position the train pipe port 14 is connected by cavity 85 directly to exhaust port 80, while equalizing reservoir port 10 is connected by cavity 86 to exhaust port 80ᵃ, so that the train pipe is vented to the atmosphere both at the engineers' valve and at the equalizing valve, thereby setting all brakes with emergency application. Cavity 87 connects main reservoir port 3 with brake cylinder port 24, thereby setting the engine brakes directly from the main reservoir, and also connects main reservoir port 3 to port 71 leading to the steam cut-off valve, thereby cutting off the steam from the engine. When the engine is second in a double header, in both service and emergency application positions, triple valve 27 opens port connected by pipe 44 to double heading valve 38. Consequently, the valve 47 is seated, closing communication between the brake pipe 16 and the main reservoir by way of feed valve 40, and preventing main reservoir pressure from flowing to the train line and kicking off the brakes. This is of special importance on the second and subsequent engines of a multiple header in which the engineer's valves are left in running or train release and engine lap position, and in which the cut-off cock 62 is closed so that main reservoir pressure can flow into the train line only by way of feed valve 40 and double heading valve 38. As soon as the brakes are released double heading valve 38 is vented through the triple valve 27 to the atmosphere, thereby permitting train pipe pressure to open valve 47 and reëstablish communication between the train line and the main reservoir through the feed valve 40.

(4) *Full release position.*—In this position the large cavity 85 connects main reservoir ports 3 and 41 with the train pipe port 14 and equalizing reservoir port 10, thereby charging both the train pipe and the equalizing reservoir and releasing the brakes in a well understood manner. The cavity 89 also connects by-pass release pipe 22 with exhaust port 80ᵇ, while cavity 92 and passage 92ᵃ connect brake cylinder port 24 with cavity 89, thus releasing the engine brakes. The small exhaust port 82 is also uncovered so that main reservoir air rushes to the atmosphere and warns the engineer to put the valve back to running position as soon as the brakes are released in order to prevent overcharging the train pipe.

(5) *Positive lap position.*—In this position practically all of the ports are lapped so as to hold the brakes in whatever position they may have been set by the previous application. The cavity 90, however, connects main reservoir port 3 with emergency cut-off valve port 68, so that should the train pipe burst from any cause, the emergency cut-off valve 38 will operate and admit main reservoir pressure through pipes 68 to the engine brake cylinder and to the steam cut-off valve, as heretofore described.

(6) *Engine release and train lap position.*—This position is usually reached from service application position to release the engine brakes and hold the train brakes. In this position cavity 88 connects by-pass release pipe port 22 with exhaust port 80ᵇ thereby releasing the engine brakes. All other ports are blanked, except that the cavity 90 connects main reservoir port 3 and emergency cut-off valve port 68 so that in the event of the bursting of a hose, fluid pressure can flow to the steam cut-off valve and engine brake cylinders, and be so held, as the air to the brake cylinder will be supplied from the main reservoir more rapidly than it can escape to the atmosphere, until the engineer moves his brake valve to some application position.

(7) *Engine application and train release position.*—This position can be reached either from running position to apply the engine brakes, or from service position to release the train brakes and hold the engine brakes. In this position main reservoir port 3 is connected by cavity 91 to brake cylinder port 24, thereby applying, or continuing the application of the engine brakes. Main reservoir port 41 is connected by cavity 85 to train pipe port 14 and equalizing reservoir port 10, thereby releasing the train brakes if they have been set, or holding them released in case they are already released. The emergency cut-off valve port 68 is still open to main reservoir pressure, so that in case of a bursting hose the steam cut-off valve will be actuated.

(8) *Engine lap position.*—This is reached from the previous position by a slight movement. Its only effect is to break the connection between the main reservoir port 3 and brake cylinder port 24, to prevent the further increase of pressure in the engine brake cylinder while maintaining the pressure already therein. All other ports are in the same condition as in the previous position.

(9) *Engine application and train full release position.*—This position can be reached either from service application position, in which case the engine brakes are held applied and the train brakes released, or it can be reached from running position, in which case the engine brakes are applied. The main reservoir port 3 is connected by cavity 90 to brake cylinder port 24 so that the engine brakes if applied are held, and if not already applied are applied thereby. The main reservoir ports 3 and 41 are connected by cavity 85 to train pipe port 14 and equalizing reservoir port 10, thereby charging both the train pipe and the equalizing reservoir and releasing the train brakes, if they have been set, or holding them released in case they were not applied. The warning port 82 is also open as is also emergency cut-off valve port 68.

(10) *Train release and engine lap position.*—This position is assumed after service application in order to release the train brakes and hold the engine brakes. The large cavity 85 connects main reservoir ports 3 and 41 with train pipe port 14 and equalizing reservoir port 10, thus charging both the train pipe and equalizing reservoir and releasing the train brakes. The brake cylinder port 24 and by-pass release pipe port 22 are both blanked so that the engine brakes are held applied. Warning port 82 is open to the atmosphere. An ordinary cut-off bleed cock 96 is placed in pipe 71 to enable the engineer to release the air from the steam cut-off valve 71$^a$ after he has cut off steam with the usual throttle, following an emergency application.

With this engineer's brake valve the warning port 82 is open in all positions where main reservoir port 3 is open to the train pipe port 14 as the train line would be overcharged if the engineer's valve remains in this position too long. The escaping air warns the engineer that the valve must be brought promptly back to some other, such as running, position, in which the main reservoir is connected to the train pipe by way of the feed valve.

In all positions of the valve except emergency position, the main reservoir is also connected to emergency cut-off valve pipe 68, thereby bringing main reservoir pressure underneath the slide valve 64, so that as soon as said slide valve is moved by the bursting of a hose or opening of the conductor's brake valve, main reservoir pressure is allowed to flow to both the engine brake cylinder and to the steam cut-off valve, thereby preventing the engine from tearing from the train.

The emergency cut-off valve 39 has no purpose other than to apply the engine brakes and cut off the steam from the engine cylinders in case of a sudden venting of air from the train line and also to prevent main reservoir pressure from escaping to the atmosphere which results in overbalancing the pressure on the opposite sides of piston 55. In case of an ordinary emergency application by moving the engineer's brake valve to proper position, the spring held valve 54 yields under the pressure of the out-rushing air and therefore does not prevent proper venting of the train line for regular emergency applications. Indeed, the piston 55 itself does not move under these circumstances because the equalizing reservoir is also vented to the atmosphere so that the pressure on opposite sides of piston 55 remains substantially balanced. After an actuation of valve 39, the cut-off cock 62 is momentarily closed, so that pressure on opposite sides of valve 54 can equalize through port 61 therein, and permit the spring 58 to move piston 55 to close communication between ports 67, 69 and 72.

The purpose or function of the double heading valve 38 has already been explained, to-wit, to close the communication between the main reservoir and the train line by way of the feed valve 40 whenever the train pipe pressure is reduced for either service or emergency application to prevent kicking off the brakes when the engine is a second or subsequent header. This, as explained, is effected by the triple valve 27 admitting auxiliary reservoir pressure to the double heading valve 38 to close communication from the main reservoir to the train pipe.

The triple valve 27 operates like any ordinary triple valve but has the necessary additional ports and the slide valve so arranged that in service application position auxiliary reservoir air alone is admitted to brake cylinder pipe 26, while in emergency application position both auxiliary reservoir and supplementary reservoir pressures are admitted to brake cylinder pipe 26; and in both service and in emergency application air is admitted through pipe 44 to double heading control valve 38 to actuate the latter and cut off connection between the main reservoir and the train pipe, while when the triple valve comes back to release position this pressure is vented from the emergency cut-off valve 38, permitting said valve to open the communication between the main reservoir and the train pipe; and in emergency application port 78 is also opened to permit auxiliary and supplementary reservoir pressures to flow through pipes 77, 70 and 71 to the steam cut-off valve.

The system described has all of the usual functions of an air brake system, to apply the brakes in either service or emergency application, to hold them in those positions, and to release them. In addition, it gives independent control over the engine and train brakes, enabling either to be set or released without setting or releasing the other. Furthermore, it includes an automatic arrangement for applying the engine brakes and cutting off the steam from the engine cylinders on account of any sudden reduction in train pipe pressure, thereby preventing the engine from tearing from the train and without necessitating attention on the part of the engineer, which arrangement, however, does not interfere with the normal emergency application from the engineer's brake valve. It further provides for increased emergency application pressure from two reservoirs, the auxiliary reservoir and the supplementary reservoir. It also provides a very simple arrangement for use in double heading whereby the main reservoirs on the subsequent engines are drawn upon for charging the train line and maintaining the pressure therein, but so arranged that without any manipulation whatsoever of valves on the subsequent engines, this connection is closed during either service or emergency application, thereby preventing the main reservoir pressure on the subsequent engines from kicking off the brakes, and leaving the brakes of the entire train absolutely under the control of the engineer on the leading engine.

What I claim is:

1. In an air brake system, the combination of a main reservoir, a train pipe, a brake cylinder, and auxiliary reservoir, a triple valve, an engineer's valve and connections therebetween, and having an additional direct connection between the engineer's valve and the brake cylinder, and a cut-off cock in the connection between the auxiliary reservoir and the brake cylinder, whereby the brake cylinder can be operated either automatically or direct, said engineer's valve being arranged when in lap position to blank the direct brake cylinder connection, and in another position to connect the direct brake cylinder connection with the atmosphere and blank the connection from the main reservoir to the train pipe, whereby the train brakes are held when the engine brakes are released.

2. In an air brake system the combination of a main reservoir, a train pipe, a brake cylinder, an auxiliary reservoir, a triple valve, an engineer's valve and connections therebetween, and having an additional direct connection between the engineer's valve and the brake cylinder, a cut-off cock in said direct connection, and a cut-off cock in the connection between the auxiliary reservoir and the brake cylinder, whereby the brake cylinder can be operated either automatically or direct, said engineer's valve being arranged when in lap position to blank the direct brake cylinder connection and in another position to connect the direct brake cylinder connection with the atmosphere and blank the connection from the main reservoir to the train pipe, whereby the train brakes are held when the engine brakes are released.

3. In an air brake system, the combination of a main reservoir, a train pipe, a brake cylinder, an auxiliary reservoir, a triple valve, an engineer's valve and connections therebetween, an additional connection between the main reservoir and train pipe, a double heading valve controlling said additional connection, and means operative when the triple valve is in application position to actuate said double heading valve to close communication from the main reservoir to the train pipe.

4. In an air brake system, the combination of a main reservoir, a train pipe, a brake cylinder, an auxiliary reservoir, a triple valve, an engineer's valve and connections therebetween, an additional connection between the main reservoir and train pipe, a double heading valve in said connection arranged to close the connection between the main reservoir and train pipe and having communication with the triple valve, whereby in application positions of the triple valve auxiliary reservoir air actuates said double heading valve to close the connection from the main reservoir to the train pipe.

5. In an air brake system, the combination of a main reservoir, a train pipe, a brake cylinder, an auxiliary reservoir, a triple valve, an engineer's valve and connections therebetween, an additional connection between the main reservoir and train pipe, a double heading valve in said connection including a casing with a differential piston mechanism therein open on its smaller area to main reservoir pressure and on its larger area connected to a port in the triple valve, a valve actuated by said differential piston mechanism and controlling connection between the main reservoir and train pipe, said triple valve being arranged in running or release position to connect the double heading valve casing to the atmosphere and in application positions to connect the same to the auxiliary reservoir, whereby in application positions said differential piston mechanism actuates the valve to close connection between the main reservoir and the train pipe.

6. In an air brake system, the combination of a main reservoir, a train pipe, a brake cylinder, an auxiliary reservoir, a triple valve, an engineer's valve and connections therebetween, an additional connection between the main reservoir and train pipe, a double heading valve in said connection arranged to control communication between the main reservoir and train pipe, and a connection therefrom to the triple valve whereby in application positions of the triple valve auxiliary reservoir air actuates said double heading valve to close the communication, from the main reservoir to the train pipe, and a cut-off cock in the connection between the main reservoir and said double heading valve.

7. In an air brake system, the combination of a main reservoir, train pipe, triple valve, auxiliary reservoir, brake cylinder, engineer's valve and connection therebetween, and a steam cut-off valve connection leading from the engineer's valve, said engineer's valve being arranged in emergency position to connect a source of fluid pressure to said steam cut-off valve connection.

8. In an air brake system, the combination of a main reservoir, train pipe, triple valve, auxiliary reservoir, brake cylinder, engineer's valve and connections therebetween, and a steam cut-off valve connection from the triple valve, said triple valve being arranged in emergency position to connect a source of fluid pressure to said steam cut-off valve connection.

9. In an air brake system, the combination of a main reservoir, train pipe, triple valve, auxiliary reservoir, brake cylinder, engineer's valve and connections therebetween, and steam cut-off valve connections to both the engineer's valve and to the triple valve, said engineer's valve being arranged when in emergency position to connect a source of fluid pressure to said steam cut-off valve, and said triple valve being arranged when in emergency position to connect a source of fluid pressure to said steam cut-off valve connection.

10. In an air brake system, the combination of a main reservoir, train pipe, triple valve, auxiliary reservoir, brake cylinder, engineer's valve and connections therebetween, a supplementary reservoir also connected to said triple valve, and a steam cut-off valve connection to said triple valve, said triple valve being arranged in service position to connect the auxiliary reservoir to the brake cylinder and in emergency position to connect both the auxiliary reservoir and the supplementary reservoir to the brake cylinder and also to the steam cut-off valve connection.

11. In an air brake system, the combination of a main reservoir, train pipe, triple valve, auxiliary reservoir, brake cylinder, engineer's valve and connections therebetween, and steam cut-off valve connections to the engineer's valve and also the triple valve, said engineer's valve being arranged in emergency position to open communication from the main reservoir to the steam cut-off valve connection, and said triple valve being arranged in emergency position to connect the auxiliary reservoir to the steam cut-off valve.

12. In an air brake system, the combination of a main reservoir, a pressure chamber, train pipe, brake cylinder, engineer's valve and connections therebetween, an emergency valve including a movable abutment balanced between train pipe and pressure chamber pressures, and valve mechanism actuated by said movable abutment and arranged upon sudden reduction of train pipe pressure to close the connection between the engineer's valve and train pipe and open a connection from the main reservoir to the brake cylinder.

13. In an air brake system, the combination of a main reservoir, pressure chamber, train pipe, brake cylinder, engineer's valve and connections therebetween, an emergency valve including a movable abutment balanced between train pipe and pressure chamber pressures, and a valve actuated by said movable abutment and arranged upon sudden reduction of train pipe pressure to open a connection from a source of fluid pressure to a steam cut-off valve.

14. In an air brake system, the combination of a main reservoir, pressure chamber, train pipe, brake cylinder, engineer's valve and connections therebetween, an emergency valve including a movable abutment balanced between train pipe and pressure chamber pressures, and a valve actuated by said movable abutment and arranged upon sudden reduction of train pipe pressure to open a connection from a source of fluid pressure to a steam cut-off valve and from the main reservoir to the brake cylinder.

15. In an air brake system, the combination of a main reservoir, pressure chamber, train pipe, brake cylinder, engineer's valve and connections therebetween, an emergency valve including a movable abutment balanced between train pipe and pressure chamber pressures, and valve mechanism actuated by said movable abutment and arranged upon sudden reduction of train pipe pressure to close the connection between the engineer's valve and train pipe and open a connection from the main reservoir to the brake cylinder and from a source of fluid pressure to a steam cut-off valve connection.

16. In an air brake system, the combination of a main reservoir, pressure chamber, train pipe, brake cylinder, engineer's valve, and connections therebetween, an emergency valve in the train pipe connection from the engineer's valve and having a connection to the pressure chamber and including a piston balanced between train pipe and supplementary reservoir pressures, a connection from the main reservoir to said emergency valve, a connection from the emergency valve to the brake cylinder, a valve actuated by said movable abutment and arranged upon sudden reduction of train pipe pressure to close the connection between the engineer's valve and the train pipe, and a second valve actuated by said movable abutment on sudden reduction of train pipe pressure and arranged to connect the main reservoir to the brake cylinder.

17. In an air brake system, the combination of a main reservoir, pressure chamber, train pipe, triple valve, auxiliary reservoir, brake cylinder, engineer's valve and connections therebetween, an emergency valve including a movable abutment balanced between train pipe and pressure chamber pressures, valve mechanism actuated by said movable abutment and arranged upon sudden reduction of train pipe pressure to close the connection between the engineer's valve and train pipe and open a connection from the main reservoir to the brake cylinder, and a connection from the triple valve to a steam cut-off valve arranged to be open to auxiliary reservoir pressure when the triple valve is in emergency position.

18. In an air brake system, the combination of a main reservoir, pressure chamber, train pipe, triple valve, auxiliary reservoir, brake cylinder, engineer's valve and connections therebetween, an emergency valve including a movable abutment balanced between train pipe and pressure chamber pressures, valve mechanism actuated by said movable abutment and arranged upon sudden reduction of train pipe pressure to close the connection between the engineer's valve and train pipe and open a connection from the main reservoir to the brake cylinder and from the main reservoir to a steam cut-off valve connection, and a connection from the triple valve to the steam cut-off valve arranged to be open to auxiliary reservoir pressure when the triple valve is in emergency position.

19. In an air brake system, the combination of a main reservoir, pressure chamber, train pipe, triple valve, auxiliary reservoir, brake cylinder, engineer's valve and connections therebetween, an emergency valve including a movable abutment balanced between train pipe and pressure chamber pressures, an additional connection from the main reservoir to said emergency valve casing, a connection from the emergency valve casing to the brake cylinder, a valve actuated by said movable abutment on sudden reduction of train pipe pressure to connect the main reservoir connection to the brake cylinder connection, and a connection from the triple valve to the steam cut-off valve arranged to be open to auxiliary reservoir pressure when the triple valve is in emergency position.

20. In an air brake system, the combination of a main reservoir, equalizing reservoir, train pipe, triple valve, auxiliary reservoir, brake cylinder, engineer's valve and connections therebetween, an emergency valve in the train pipe connection from the engineer's valve and having a connection to the equalizing reservoir and including a movable abutment balanced between train pipe and equalizing reservoir pressures, an additional connection from the main reservoir to said emergency valve casing, a valve actuated by said movable abutment and arranged upon sudden reduction of train pipe pressure to close the connection between the engineer's valve and the train pipe, a connection from the emergency valve casing to the brake cylinder, a valve actuated by said movable abutment on sudden reduction of train pipe pressure to connect the main reservoir connection to said brake cylinder connection, and a connection from the triple valve to the steam cut-off valve arranged to be open to auxiliary reservoir pressure when the triple valve is in emergency position.

21. In an air brake system, the combination of a main reservoir, pressure chamber, train pipe, triple valve, auxiliary reservoir, brake cylinder, engineer's valve and connections therebetween, an emergency valve including a movable abutment balanced between train pipe and pressure chamber pressures, a valve actuated by said movable abutment and arranged on sudden reduction of train pipe pressure to connect the main reservoir to the brake cylinder, a connection from the triple valve to the steam cut-off valve arranged to be open to auxiliary reservoir pressure when the triple valve is in emergency position, and a cut-out cock between the emergency valve and the triple valve.

22. In an air brake system, the combination of a main reservoir, pressure chamber, train pipe, triple valve, auxiliary reservoir, brake cylinder, engineer's valve and connections therebetween, an emergency valve including a movable abutment balanced between train pipe and pressure chamber pressures, valve mechanism actuated by said movable abutment and arranged upon sudden reduction of train pipe pressure to close the connection between the engineer's valve and the train pipe and open a connection from the main reservoir to the brake cylinder, a connection from the triple valve to the steam cut-off valve arranged to be open to auxiliary reservoir pressure when the triple valve is in emergency position, and a cut-out cock between the emergency valve and the triple valve.

23. In an air brake system, the combination of a main reservoir, pressure chamber, train pipe, triple valve, auxiliary reservoir, brake cylinder, engineer's valve and connections therebetween, an emergency valve including a movable abutment balanced between train pipe and pressure chamber pressures, valve mechanism actuated by said movable abutment and arranged upon sudden reduction of train pipe pressure to close the connection between the engineer's valve and train pipe and open a connection from the main reservoir to the brake cylinder and from the main reservoir to a steam cut-off valve connection, a connection from the triple valve to the steam cut-off valve arranged to be open to auxiliary reservoir pressure when the triple valve is in emergency position, and a cut-out cock between the emergency valve and the triple valve.

24. In an air brake system, the combination of a main reservoir, equalizing reservoir, train pipe, triple valve, auxiliary reservoir, brake cylinder, engineer's valve and connections therebetween, an emergency valve in the train pipe connection from the engineer's valve and having a connection to the equalizing reservoir and including a movable abutment balanced between train pipe and equalizing reservoir pressures, an additional connection from the main reservoir to the emergency valve casing, connections from said emergency valve casing to the brake cylinder and to a steam cut-off valve, a valve actuated by said movable abutment and arranged on sudden reduction of train pipe pressure to connect the main reservoir connection to both the brake cylinder and steam cut-off valve connection, a connection from the triple valve to the steam cut-off valve arranged to be open to auxiliary reservoir pressure when the triple valve is in emergency position, and a cut-out cock between the emergency valve and the triple valve.

25. In an air brake system, the combination of a main reservoir, equalizing reservoir, train pipe, triple valve, auxiliary reservoir, brake cylinder, engineer's valve and connections therebetween, an emergency valve in the train pipe connection from the engineer's valve and having a connection to the equalizing reservoir and including a movable abutment balanced between train pipe and equalizing reservoir pressures, an additional connection from the main reservoir to said emergency valve casing, a valve actuated by said movable abutment and arranged upon sudden reduction of train pipe pressure to close the connection between the engineer's valve and the train pipe, a second connection from the emergency valve casing to the brake cylinder, a valve actuated by said movable abutment on sudden reduction of train pipe pressure to connect the main reservoir connection to the brake cylinder connection, a connection from the triple valve to the steam cut-off valve arranged to be open to auxiliary reservoir pressure when the triple valve is in emergency position, and a cut-out cock between the emergency valve and the triple valve.

26. In an air brake system, the combination of a main reservoir, equalizing reservoir, train pipe, triple valve, auxiliary reservoir, brake cylinder, engineer's valve and connections therebetween, an emergency valve including a movable abutment balanced between train pipe and equalizing reservoir pressures, valve mechanism actuated by said movable abutment and arranged upon sudden reduction of train pipe pressure to close the connection between the engineer's valve and train pipe and open a connection from the main reservoir to the brake cylinder, a connection from the triple valve to a steam cut-off valve arranged to be open to auxiliary reservoir pressure when the triple valve is in emergency position, a connection from the main reservoir to the train pipe, a double heading valve in said connection, and a connection from the triple valve to said double heading valve arranged when the triple valve is in application position to actuate the double heading valve and close the connection from the main reservoir to the train pipe.

27. In an air brake system, the combination of a main reservoir, equalizing reservoir, train pipe, triple valve, auxiliary reservoir, brake cylinder, engineer's valve and connections therebetween, an emergency valve including a movable abutment balanced between train pipe and equalizing reservoir pressures, valve mechanism actuated by said movable abutment and arranged upon sudden reduction of train pipe pressure to close the connection between the engineer's valve and train pipe and open a connection from the main reservoir to the brake cylinder and from the main reservoir to a steam cut-off valve, a connection from the triple valve to the steam cut-off valve arranged to be open to auxiliary reservoir pressure when the triple valve is in emergency position, a connection from the main reservoir to the train pipe, a double heading valve in said connection, and a connection from the triple valve to said double heading valve arranged when the triple valve is in application position to actuate said valve and close the connection from the main reservoir to the train pipe.

28. In an air brake system, the combination of a main reservoir, equalizing reservoir, train pipe, triple valve, auxiliary reservoir, brake cylinder, engineer's valve and connections therebetween, an emergency valve including a movable abutment balanced between train pipe and equalizing reservoir pressures, an additional connection from the main reservoir to said emergency valve casing, a connection from the emergency valve casing to the brake cylinder, a valve actuated by said movable abutment and arranged on sudden reduction of train pipe pressure to connect the main reservoir to the brake cylinder, a connection from the triple valve to a steam cut-off valve arranged to be open to auxiliary reservoir pressure when the triple valve is in emergency position, a connection from the main reservoir to the train pipe, a double heading valve in said connection, and a connection from the triple valve to said double heading valve arranged when the triple valve is in application position to actuate the double heading valve and close the connection from the main reservoir to the train pipe.

29. In an air brake system, the combination of a main reservoir, equalizing reservoir, train pipe, triple valve, auxiliary reservoir, brake cylinder, engineer's valve, and connections therebetween, an emergency valve including a movable abutment balanced between train pipe and equalizing reservoir pressures, valve mechanism actuated by said movable abutment and arranged upon sudden reduction of train pipe pressure to close the connection between the engineer's valve and train pipe and open a connection from the main reservoir to the brake cylinder, and a connection from the triple valve to a steam cut-off valve arranged to be open to auxiliary reservoir pressure when the triple valve is in emergency position, a cut-out cock between the emergency valve and the triple valve, a connection from the main reservoir and the train pipe, a cut-out cock in said connection, a double heading valve in said connection, and a connection from the triple valve to said double heading valve arranged when the triple valve is in application position to actuate the double heading valve and close the connection from the main reservoir to the train pipe.

30. In an air brake system, the combination of a main reservoir, equalizing reservoir, train pipe, triple valve, auxiliary reservoir, brake cylinder, engineer's valve and connections therebetween, an emergency valve including a movable abutment balanced between train pipe and equalizing reservoir pressures, valve mechanism actuated by said movable abutment and arranged upon sudden reduction of train pipe pressure to close the connection between the engineer's valve and train pipe and open a connection from the main reservoir to the brake cylinder and from the main reservoir to a steam cut-off valve, a connection from the triple valve to the steam cut-off valve arranged to be open to auxiliary reservoir pressure when the triple valve is in emergency position, a cut-out cock between the emergency valve and the triple valve, a connection from the main reservoir and the train pipe, a cut-out cock in said connection, a double heading valve in said connection, and a connection from the triple valve to said double heading valve arranged when the triple valve is in application position to actuate said valve and close the connection from the main reservoir to the train pipe.

31. In an air brake system, the combination of a main reservoir, equalizing reservoir, train pipe, triple valve, auxiliary reservoir, brake cylinder, engineer's valve and connections therebetween, an emergency valve including a movable abutment balanced between train pipe and equalizing reservoir pressures, an additional connection from the main reservoir to said emergency valve casing, a connection from the emergency valve casing to the brake cylinder, a valve actuated by said movable abutment and arranged on sudden reduction of train pipe pressure to connect the main reservoir to the brake cylinder, a connection from the triple valve to a steam cut-off valve arranged to be open to auxiliary reservoir pressure when the triple valve is in emergency position, a cut-out cock between the emergency valve and the triple valve, a connection from the main reservoir and the train pipe, a cut-out cock in said connection, a double heading valve in said connection, and a connection from the triple valve to said double heading valve arranged when the triple valve is in application position to actuate the double heading valve and close the connection from the main reservoir to the train pipe.

32. In an air brake system, the combination of a source of pressure, a reservoir, a train pipe, a steam cut-off valve, a casing connected to said source of pressure, reservoir, train pipe and steam cut-off valve, a movable abutment in said casing open on one side to train pipe pressure and on its opposite side to reservoir pressure, a valve actuated by said movable abutment, and ports and passages controlled by said valve and arranged on abnormal reduction of pressure on the train pipe side of the movable abutment to connect the source of pressure with the steam cut-off valve.

33. In an air brake system, the combination of a source of pressure, a reservoir, a train pipe, a steam cut-off valve, a valve casing having connections to said source of pressure, reservoir, train pipe and steam cut-off valve, a movable abutment in said casing open to train pipe pressure on one side and to reservoir pressure on its other side, a valve actuated by said movable abutment, and ports and passages controlled by said valve and arranged on reduction of pressure on the train pipe side of the movable abutment to connect the source of pressure with the steam cut-off valve and with the brake cylinder.

34. In an air brake system, the combination of a source of pressure, a reservoir, a train pipe, a steam cut-off valve, a valve casing having connections to said source of pressure, reservoir, train pipe and steam cut-off valve, a movable abutment in said casing open to train pipe pressure on one side and to reservoir pressure on its other side, a valve actuated by said movable abutment, ports and passages controlled by said valve and arranged on reduction of pressure on the train pipe side of the movable abutment to connect the source of pressure with the steam cut-off valve and with the brake cylinder, and a second valve actuated by said movable abutment and arranged to cut off communication between the main reservoir and the train pipe.

35. In an air brake system, the combination of a train pipe, brake cylinder, auxiliary reservoir, steam cut-off valve, and a triple valve having connections to said train pipe, brake cylinder, auxiliary reservoir and steam cut-off valve and also to the atmosphere and provided with ports and valve mechanism arranged in emergency position to open communication from the auxiliary reservoir to the brake cylinder and also to the steam cut-off valve.

36. In an air brake system, the combination of a train pipe, brake cylinder, auxiliary reservoir, supplementary reservoir, a steam cut-off valve, and a triple valve having connections to said train pipe, brake cylinder, auxiliary reservoir, supplementary reservoir and steam cut-off valve and also to the atmosphere and provided with ports and valve mechanism arranged in emergency position to open communication from both the auxiliary and supplementary reservoirs to the brake cylinder and also establish communication from a reservoir to the steam cut-off valve.

37. In an air brake system, the combination of a train pipe, brake cylinder, auxiliary reservoir, supplementary reservoir, steam cut-off valve, and a triple valve having connections to the train pipe, brake cylinder, auxiliary reservoir, supplementary reservoir and a steam cut-off valve and also to the atmosphere, and having ports and valve mechanism arranged in emergency position to open communication from the train pipe and the supplementary and auxiliary reservoirs to the brake cylinder, and from a reservoir to the steam cut-off valve.

In testimony whereof, I have hereunto set my hand.

JACOB RUSH SNYDER.

Witnesses:
ELBERT L. HYDE,
WILLIAM B. WHARTON.

---

Copies of this patent may be obtained for five cents each, by addressing the "Commissioner of Patents, Washington, D. C."